United States Patent
Heidasch

(10) Patent No.: US 9,015,086 B2
(45) Date of Patent: Apr. 21, 2015

(54) LEARNABLE CONTEXTUAL NETWORK

(75) Inventor: Robert Heidasch, Speyer (DE)

(73) Assignee: SAP SE, Walldorf (DE)

(*) Notice: Subject to any disclaimer, the term of this patent is extended or adjusted under 35 U.S.C. 154(b) by 363 days.

(21) Appl. No.: 13/428,850

(22) Filed: Mar. 23, 2012

(65) Prior Publication Data

US 2013/0254144 A1    Sep. 26, 2013

(51) Int. Cl.
*G06N 7/00*    (2006.01)
*G06N 3/04*    (2006.01)

(52) U.S. Cl.
CPC .............. *G06N 7/005* (2013.01); *G06N 3/0454* (2013.01)

(58) Field of Classification Search
CPC ............ G06N 3/02; G06N 3/04; G06N 7/005
See application file for complete search history.

(56) References Cited

U.S. PATENT DOCUMENTS

2006/0218192 A1* 9/2006 Gopalakrishnan ......... 707/104.1
2010/0153324 A1* 6/2010 Downs et al. .................. 706/21

OTHER PUBLICATIONS

Cheng et al, An ontology-based business intelligence application in a financial knowledge management system, 2009.*
Ehrig et al, Measuring Similarity between Semantic Business Process Models, 2007.*
Hofferer, Achieving Business Process Model Interoperability Using Metamodels and Ontologies, 2007.*
Hung et al, Neural Network-based Document Clustering Using WordNet Ontologies, 2005.*

* cited by examiner

*Primary Examiner* — Alan Chen
*Assistant Examiner* — Mikayla Chubb
(74) *Attorney, Agent, or Firm* — Schwegman Lundberg & Woessner, P.A.

(57) ABSTRACT

A method and apparatus for detection of relationships between objects in a meta-model semantic network is described. Semantic objects and semantic relations of a meta-model of business objects are generated from a meta-model semantic network. The semantic relations are based on connections between the semantic objects. A neural network is formed based on usage of the semantic objects and the semantic relations. The neural network is integrated with the semantic objects and the semantic relations to generate a contextual network. A statistical analysis of the connections between the semantic objects in the contextual network is performed to identify stronger semantic relations. The identified stronger semantic relations are used to update the neural network. The updated neural network is integrated into the contextual network.

20 Claims, 6 Drawing Sheets

LEARNABLE CONTEXTUAL NETWORK

FIELD

The present disclosure relates generally to data searches. In an example embodiment, the disclosure relates to searching enterprise data.

BACKGROUND

Generally, a search engine is a program that is designed to search for information from a variety of sources of data, such as the World Wide Web and File Transfer Protocol (FTP) servers. Many of these conventional search engines are designed to conduct searches based on a matching of keywords. For example, a conventional search engine searches documents for keywords, which are specified by a user, and returns a list of documents in which the keywords are found.

However, conventional search engines often do not take into account the semantic meaning of the keywords found in the enterprise data, such as, for example, business objects and business documents. To clarify this discussion, a "business object," as used herein, may refer to a representation of a business entity, such as an employee or a sales order, in an enterprise system. That is, a business object is a type of entity inside the business layer in an n-layered architecture of object-oriented computer programs. A business object encompasses both the functions (in the form of methods) and the data (in the form of attributes) of this business entity.

When searching business objects, for example, a typical search engine may simply search the attributes associated with business objects. For example, in response to receiving a query for "employees located in San Diego," the typical search engine may return a business object of a company with a name of "San Diego Surf Shop" because the business object of the company has an attribute containing "San Diego." However, this is not what the user wants because the business record is not an employee, nor is the company even located in San Diego. As a result, many of these conventional search engines are notoriously inaccurate at searching for enterprise data containing keywords with meanings that depend on the context of the attribute.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
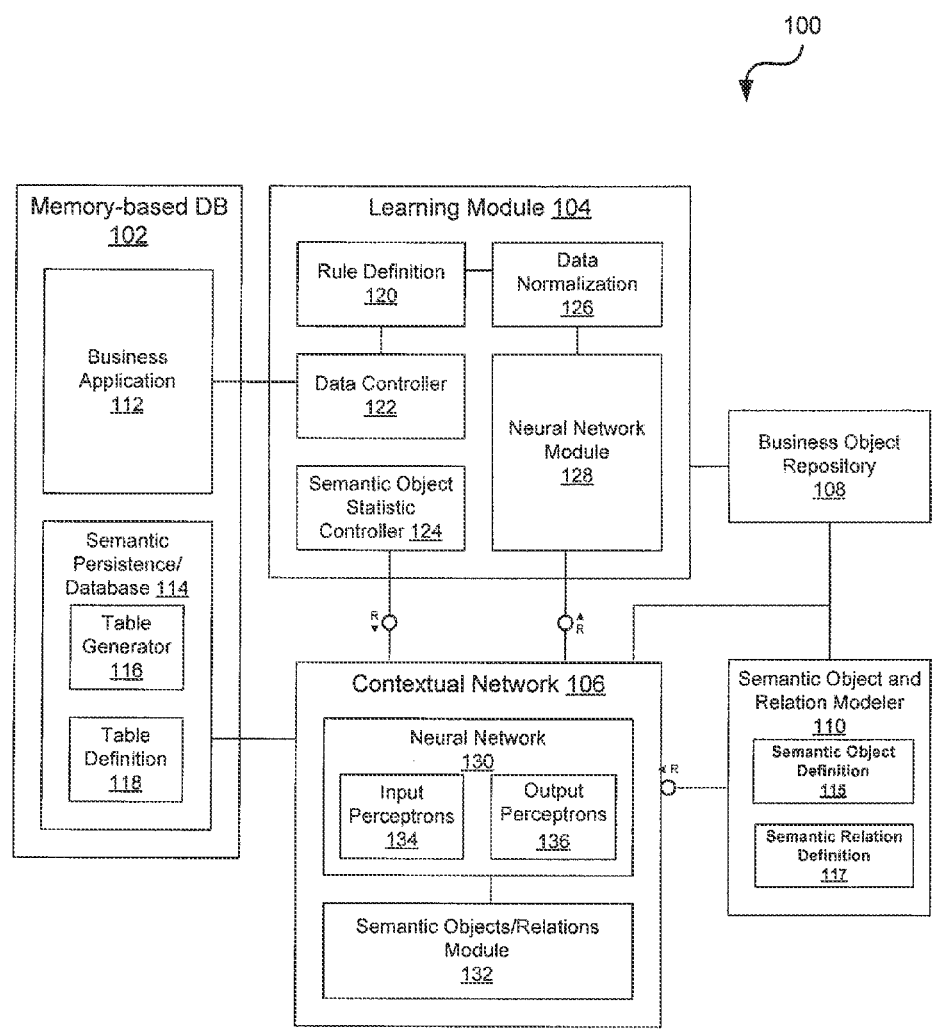
FIG. 1 is a block diagram depicting an architectural overview of a learnable contextual network for objects in a meta-model semantic network, in accordance with an example embodiment.

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Some embodiments described herein provide a method and an apparatus for detection of relationships between objects in a meta-model semantic network. Semantic objects and semantic relations of a meta-model of business objects are generated from a meta-model semantic network. The semantic relations are based on connections between the semantic objects. A neural network is formed based on usage of the semantic objects and the semantic relations. The neural network is integrated with the semantic objects and the semantic relations to generate a contextual network. A statistical analysis of the connections between the semantic objects in the contextual network is performed to identify stronger semantic relations. The identified stronger semantic relations are used to update the neural network. The updated neural network is integrated into the contextual network.

Prior to discussing specific example embodiments, further descriptions of some terms are now provided for a better understanding of the descriptions set forth herein.

"Enterprise data," as used herein, may refer to data maintained by an enterprise, such as a business, individual, group, or any other organization. Examples of enterprise data include, for example, business objects, business documents, notes, bookmarks, annotations, terminology, or any other business concept. In some embodiments, the enterprise data may be extracted from heterogeneous sources (e.g., an email database server and a purchase order database). Further, the enterprise data may be structured (e.g., type defined via a schema, such extensible markup language (XML)) or unstructured (e.g., word documents).

As used herein, a "semantic network" may refer to a network of semantic objects connected through semantic relations. A "semantic object," as used herein, may refer to a conceptual representation of a notion recognized by an enterprise, such as a product, person, employee, customer, business, document, case, project, business object, term, or any other suitable data. A "semantic relation," as used herein, may refer to a relationship between two or more semantic objects. Such relationships may have attributes and a type or definition that provides a conceptual meaning to how the two or more semantic objects are related to each other.

As used herein, a "meta-model semantic network" may refer to a semantic network generated based on a meta-model of the enterprise data. A "meta-model," as used herein, is a model that characterizes the conceptual meaning of elements of a business object definition. In turn, a "model" is a characterization of instances of an enterprise data. A definition of a business object is an example of a model. The definition may model an instance by defining the attributes (e.g., an address) associated with the business object. The meta-model then models these attributes and gives meaning to attributes (e.g., an address is a location).

"Semantic information," as used herein, may refer to information that provides conceptual meaning to enterprise data. Such semantic information may associate particular enterprise data with concepts maintained by an enterprise. For example, a collection of attributes (e.g., street, city, state, zip code, and the like) may be given a meaning of understanding (e.g., location). Such semantic information may be formally organized as "semantic object definitions" and "semantic relation definitions."

FIG. 1 is a block diagram depicting an architectural overview of a learnable contextual network system 100 for objects in a meta-model semantic network, in accordance with an example embodiment.

The learnable contextual network system 100 includes memory-based database 102, a learning module 104, a contextual network 106, a business object repository 108, and a semantic object and relation modeler 110. The learning module 104, the contextual network 106, and the semantic object and relation modeler 110 may be embodied, individually or in combination, in a computing device in the form of, for example, a personal computer, a server computer, or any other suitable computing device. In various embodiments, the computing device may be used to implement computer programs, logic, applications, methods, processes, or software to determining existing relationships between objects in a meta-model semantic network using information, as described in more detail below.

Figure 3:
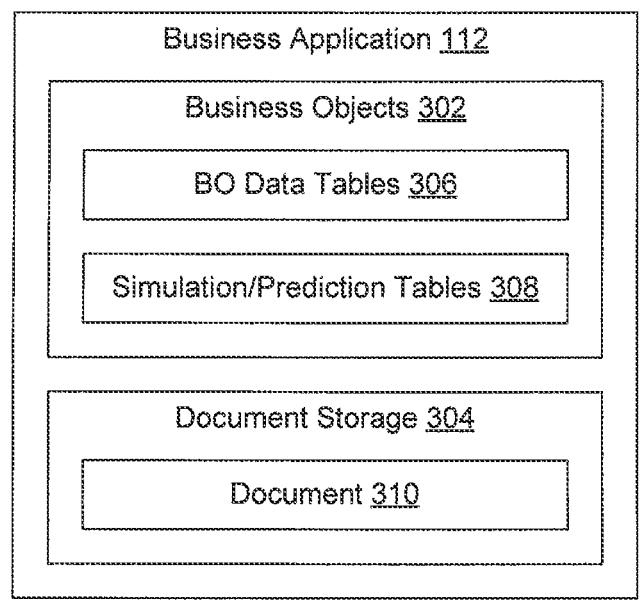
FIG. 3 is a block diagram illustrating a business application, in accordance with an example embodiment.

In one embodiment, the memory-based database 102 includes a business application 112 and a semantic persistence/database 114. The memory-based database 102 includes, for example, SAP HANA DB from SAP, a German company. The memory-based database 102 may be used by business application 112, which contains business objects. FIG. 3 illustrates one embodiment of a business application 112 that includes business objects 302 and document storage 304. The business objects 302 may include business object data table 306 (e.g., business data) and simulation/prediction tables 308. The document storage 304 includes business documents 310.

Referring back to FIG. 1, the semantic persistence/database 114 is configured to store a table generator 116 and a table definition 118. For example, the table generator 116 may be configured to generate tables used as storage for information (data and metadata) used by a contextual network (e.g., persistence for semantic objects and relation), and a neural network. For example, the table definition 118 may include data and metadata used by contextual network (see above) and the tables contain instance data of particular semantic objects and relation, and existing neural networks, e.g. neural network configuration data (e.g. configuration data describing input and output perceptrons) training data—data used to train particular neural network (e.g. training, validation and test data), and data generated during usage of the neural network by the end-user (e.g. calculated prediction data).

The contextual network 106 integrates a neural network 130 with a semantic objects/relations module 132. The contextual network 106 may be seen as an extension of a meta-model semantic network that contains the semantic objects and semantic relations from semantic objects/relations module 132 and the neural networks 130.

Figure 2:
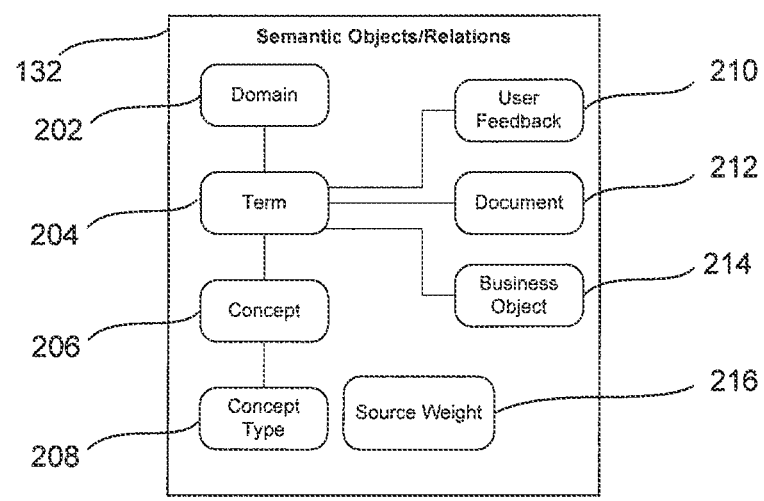
FIG. 2 is a block diagram illustrating a semantic object/relation, in accordance with an example embodiment.

FIG. 2 illustrates an example of a semantic objects/relations module 132. The meta-model semantic network 132 includes nodes that link a term 204 to a domain 202 and a concept 206. In turn, the concept 206 may be linked to a concept type 208. Although FIG. 2 shows the nodes of a semantic network of contextual network 106 as single entities, it is to be appreciated that the semantic network may include fewer or more nodes apart from those shown in FIG. 2. For example, a concept may be linked to one or more terms. Still further, additional and different nodes may be utilized by a meta-model semantic network.

The term 204 may be a word or phrase found in a business application, a document, the Internet or Web, or manually created by an end-user. The concept 206 may refer to a unit of meaning to which the term 204 refers, such as a specific idea or notion. The concept 206 groups all the terms that are used to express this idea as synonyms. For example, a product may be associated with multiple product names. Accordingly, each of the product names may be stored as separate terms in the meta-model semantic network, but all be linked to the same product concept.

The domain 202 may associate the term 204 with a particular knowledge domain used within an enterprise. A collection of terms associated with a particular domain may then define the vocabulary used to describe concepts in a knowledge domain.

The concept type 208 may be metadata that characterizes the attributes associated with the concept 206. The concept type 208 may, for example, describe the attributes associated with the concept 206 for a particular product.

The contextual network 106 may also include nodes that relate the term 204 to enterprise data, such as a user feedback object 210, a document 212, and a business object 214 and/or its elements. A user feedback object 210 may be any data embedded into enterprise data to provide further contextual data to the enterprise data. Notes, bookmarks, annotations, or any other user embedded data are examples of user feedback objects.

In some embodiments, the semantic relations between the term 204 and the nodes 210, 212, 214 may be influenced by a source weight 216. The source weight 216 may be a weighting factor that makes some relationships more relevant. In some embodiments, the source weight 216 may indicate that a node is more or less relevant based on the user feedback object 210. In other cases, a document 212 that merely mentions some of the attributes of a concept 206 may receive a lesser weight than a business object that includes much the relevant relations and attributes.

Referring back to FIG. 1, the semantic persistence database 114 may store different meta-model semantic networks of contextual network 106. For example, a first meta-model semantic network may include semantic relations and semantic objects optimized to respond to queries directed to sales orders (e.g., who created a sales order, which suppliers provide a certain part, etc), while another meta-model semantic network may include semantic relations and semantic objects optimized to respond to queries related to finding experts in a domain.

As described above, the contextual network 106 may be a neural network 130 in addition to a semantic network that includes semantic objects relations module 132, which provide meaning to particular enterprise data, such as, for example, business objects, business documents, notes, bookmarks, annotations, terminology, or any other business concept or enterprise data used within the enterprise. For example, John Smith, as a concept within the enterprise, may be associated with various business objects (e.g., a sales order, employee record, customer record, or any other suitable business object) and with documents created or otherwise involving John Smith.

As described above, the semantic objects/relations module 132 stored in the contextual network 106 may be based, in part, on semantic object definitions 115 and semantic relation definitions 117 of the semantic object and relation modeler 110. Such semantic definitions may be based on a meta-model of the enterprise data. For example, the semantic object and relation modeler 110 is a modeling tool that uses a meta-modeling based approach to generate a semantic object definition 115 and a semantic relation definition 117. The semantic object definition 115 and the semantic relation definition 117 may extend the definitions of enterprise data (e.g., business objects) at the meta-model level to provide semantic information. Such semantic information provides supplemental meaning to the elements, attributes, and relations between the business objects. As an example, the definition of an employee business object may be associated with an address. In some embodiments, such an address may be a field of the business object, and, in other embodiments, such an address may be represented by a separate business object. In this example, the semantic object and relation modeler 110 may extend the definition of the employee definition, at the meta-model level, to give the address field the semantic meaning of location. That is, the association between the employee and the address characterizes the location of the particular employee.

In some embodiments, to assist an enterprise user in creating the semantic object definition 115 and the semantic relation definition 117, the semantic object and relation modeler 110 may extract existing enterprise definitions stored in a business object repository 108. For example, a source of business object definitions in an SAP environment may be the SAP Enterprise Service Repository (ESR) or the SAP By-Design Model Repository. Once the business object definitions are extracted from the business object repository 108, the semantic object and relation modeler 110 may be configured to provide, for example, a user interface to an enterprise user so that the enterprise user can model such definitions in a way that gives semantic meaning to the business objects.

The semantic object and relation modeler 110 may be configured to send the semantic object definition 115 and the semantic relation definition 117 to the contextual network 106 (for example, in particular to the semantic objects/relations module 132). In turn, the semantic objects/relations module 132 may generate rule definitions.

As described above, the contextual network 106 may store relations with enterprise data. In some embodiments, the contextual network 106 may receive the enterprise data through a text analyzer (not shown). The text analyzer is configured to extract enterprise data from enterprise data sources and export objects and relations to the contextual network 106. The text analyzer may extract enterprise data stored by enterprise systems, such as a business object stored by a business application and/or a document stored by a document storage system. The business application and the document storage system are examples of enterprise data sources. As is explained below, data derived from the business object and the document may be obtained through a crawler. Based on the rule definition, the text analyzer communicates objects and relations to the contextual network 106.

The business terminology and the business information may be integrated in the contextual network 106, also referred to as a contextual network graph.

Elements of the contextual network graph include semantic objects and semantic relations (relations between particular semantic objects) that allow defining semantically particular business objects, document, domains, terms, concepts, cases, notes, bookmarks, and the like (any kind of object that encapsulates some data and/or functionality). The semantic relation is an object defined by respective a meta-model that defines the link type, its importance (source weight—authority, see below), direction (simple/bidirectional), and the like. The semantic relations defines also the interesting for the semantic compound relations—relation chains that allows finding experts (who is working on particular topic, using particular terminology, etc relevant documents (e.g. which documents are describing sale of particular material, etc.), business partners (e.g. which supplier offers a required material that fulfils conditions, etc.) . . . . One aspect of the present embodiment is scalability and performance of the contextual network graph.

The neural network 130 may include input perceptrons 134 and output perceptrons 136. The input and output perceptrons 134 and 136 (input and output layer elements) of the neural network 130 are integrated with the semantic object and its elements. In other words, the input and output perceptrons 134 and 136 do not feed to the neural network's hidden layers. In this case, the semantic relations are extended and may be additionally defined by the neural-based relations. Therefore, if a business user requests some information/relation, the contextual network provides the possibility to depict its function and offers the simulation functionality.

The particular semantic objects and its elements can be used as the integration or anchor point to many input and/or output perceptrons 134 and 136. This means the contextual network 106 supports "multi-layering" of the neural network 130 which can be understood as a "parallel" defined neural network that may depict different aspects of business functionality. This is accomplished with a slightly different definition of used input and output elements.

The learning module 104 allows the calculation of dependencies between particular business elements (e.g., how marketing campaigns (cost and marketing actions) influence the required investments (existing production capacity) and the short- and long-term financial benefits). The learning module 104 consists of rule definition 120, data controller 122, data normalization 126, and neural network module 128 that support integration of the learning module 104 with memory-based database 102 and the creation and calculation of neural network 130.

The rule definition 120 defines how the existing data in memory can be combined to build particular input parameters. The module may use modeling environments and the business data definitions stored in the Business Object Repository to build rules.

The data normalization 126 is a module that automatically normalizes the input data and is mainly used to simplify the learning calculation of the neural network (speed-up the learning process of neural network).

The data controller 122 is a module that controls the access to the SAP HANA DB data (a different controller may be used to access other memory based DBs) and transfers the required data in memory to and from DB. The read action is related to data (e.g., input and output parameters) used in the learning phase and also to simulation/prediction input data in productive usage. The write operation is related to output parameters in productive usage that are then stored in separate tables. The tables may be generated by the table generator 116 on the fly and reflect the input and output parameters of the network(s).

The neural network module 128 creates and calculates a neural network that represents the relations between particular business elements. The configuration of the network requires defining a few initial parameters (e.g., network type (supervised/non-supervised), network architecture (hidden layers, etc.), and used optimization method (e.g., usage of back-propagation or other methods)).

The semantic object statistic controller 124 allows the statistical analysis of the existing connections/links between particular semantic objects. The relations are created regarding business functionality defined in existing business applications and detected in different business related documents. Additionally, system interaction with the end-user (e.g., business expert) allows detection of the requested connections (e.g., the end used finds semantic objects creating notes, favorites cause creation of new semantic relations). These relations are strengthened and become more important if they are often used in business applications, business documents, and by the end-users. In one embodiment, this information is the basis of the statistical analysis in the statistic controller.

The strongest and/or most important semantic relation is then provided to the business expert that can manually or automatically (the system using the business element definition and the respective business data) use a machine learning algorithm to create and optimize the neural network 130. The newly created network is then automatically integrated into contextual network 106 and exposed for usage by the business user. In this case, the system automatically creates a cycle: business application, document, or user interaction causes a creation of semantic relations; its usage causes creation of the neural network 130; and the business object and knowledge definition together with business data allows building and training of the network, which is finally integrated into the contextual network 106. The previous situation may also be referred to as self-learning functionality in business applications.

With respect to FIG. 1, it should be appreciated that in other embodiments, the system 100 may include fewer or more components apart from those shown in FIG. 1. For example, in an alternate embodiment, the learning module 104 can be integrated within the contextual network 106. The components and respective modules shown in FIG. 1 may be in the form of software that is processed by a processor. In another example, as explained in more detail below, the components and respective modules shown in FIG. 1 may be in the form of firmware that is processed by application specific integrated circuits (ASIC), which may be integrated into a circuit board. Alternatively, the components and respective modules shown in FIG. 1 may be in the form of one or more logic blocks included in a programmable logic device (for example, a field programmable gate array). The components and respective modules shown in FIG. 1 may be adapted, and/or additional structures may be provided, to provide alternative or additional functionalities beyond those specifically discussed in reference to FIG. 1. Examples of such alternative or additional functionalities will be discussed in reference to the flow diagrams discussed below.

Figure 4:
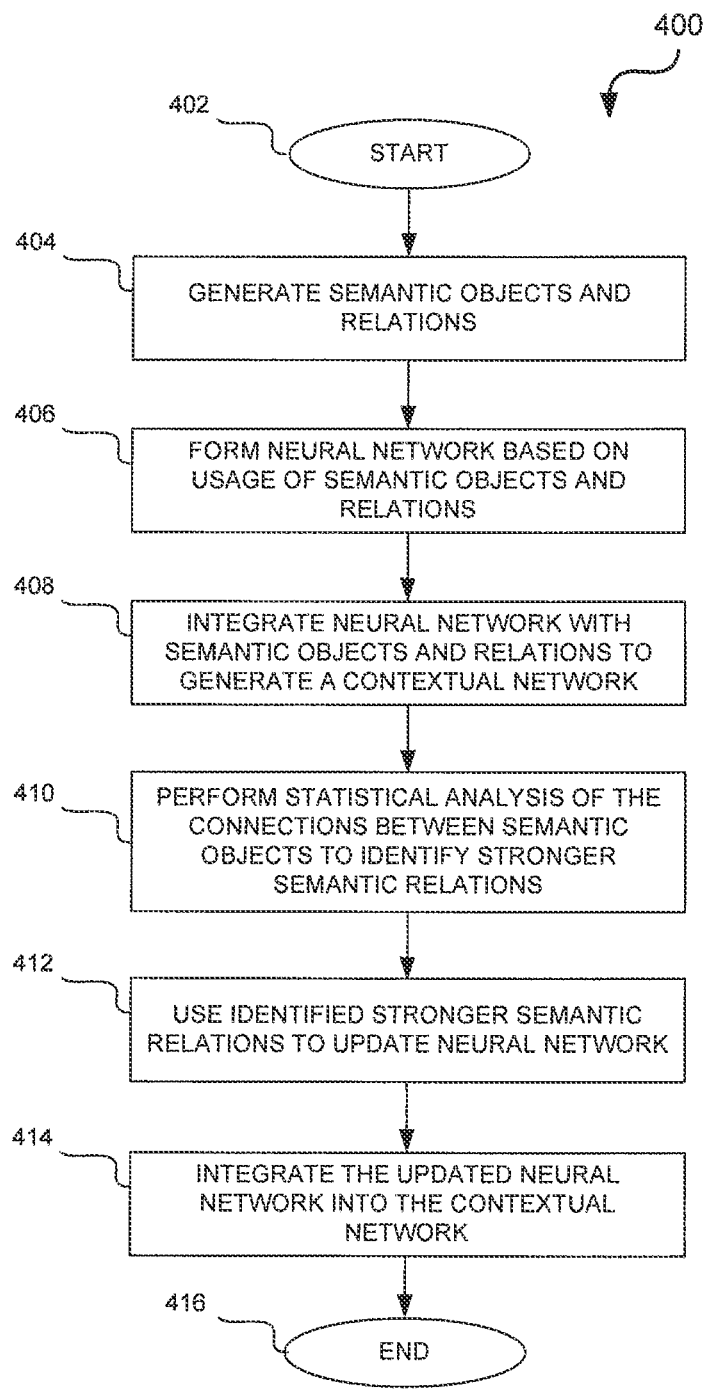
FIG. 4 depicts a flow diagram of a general overview of a method for learning relationships between objects in a meta-model semantic network, in accordance with an example embodiment.

FIG. 4 depicts a flow diagram of a general overview of a method 400 for learning relationships between objects in a meta-model semantic network, in accordance with an embodiment.

In an example embodiment, the method 400 may be implemented by the learning module 104 and contextual, network 106 included in the system 100 of FIG. 1.

Referring to FIG. 4, the method for learning relationships between objects in a meta-model semantic network may begin at operation 402. Then, at operation 404, semantic objects and semantic relations of a meta-model of business objects are generated from a meta-model semantic network. The semantic relations are based on connections between the semantic objects.

At operation 406, a neural network is formed based on usage of the semantic objects and the semantic relations.

At operation 408, the neural network is integrated with the semantic objects and the semantic relations to generate a contextual network.

At operation 410, a statistical analysis of the connections between the semantic objects in the contextual network is performed to identify stronger semantic relations.

At operation 412, the identified stronger semantic relations are used to update the neural network.

Finally, at operation 414, the updated neural network is integrated into the contextual network. The method ends at operation 416.

Figure 5:
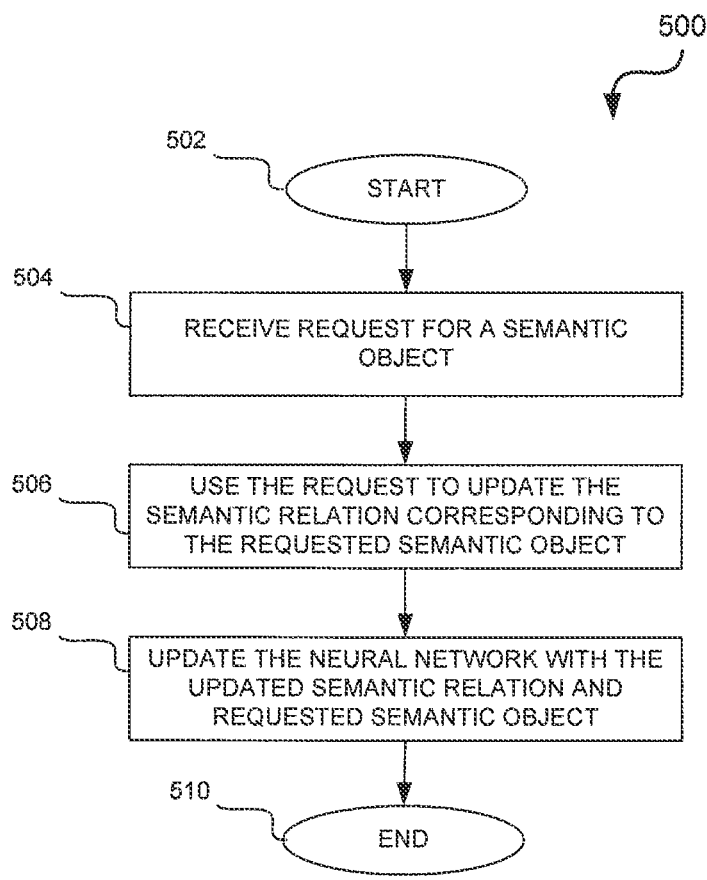
FIG. 5 depicts a flow diagram of a general overview of a method for updating relationships between objects in a meta-model semantic network, in accordance with an example embodiment.

FIG. 5 depicts a flow diagram of a general overview of a method 500 for updating relationships between objects in a meta-model semantic network, in accordance with another embodiment.

In an example embodiment, the method 500 may be implemented by the learning module 104 included in the system 100 of FIG. 1.

Referring to FIG. 5, the method for updating relationships between objects in a meta-model semantic network may begin at operation 502. Then, at operation 504, the learning module 104 receives a request for a semantic object in the contextual network from a business user.

At operation 506, the request is used to update the semantic relation corresponding to the requested semantic object.

At operation 508, the neural network is updated using the updated semantic relation and requested semantic object. The method ends at operation 510.

Figure 6:
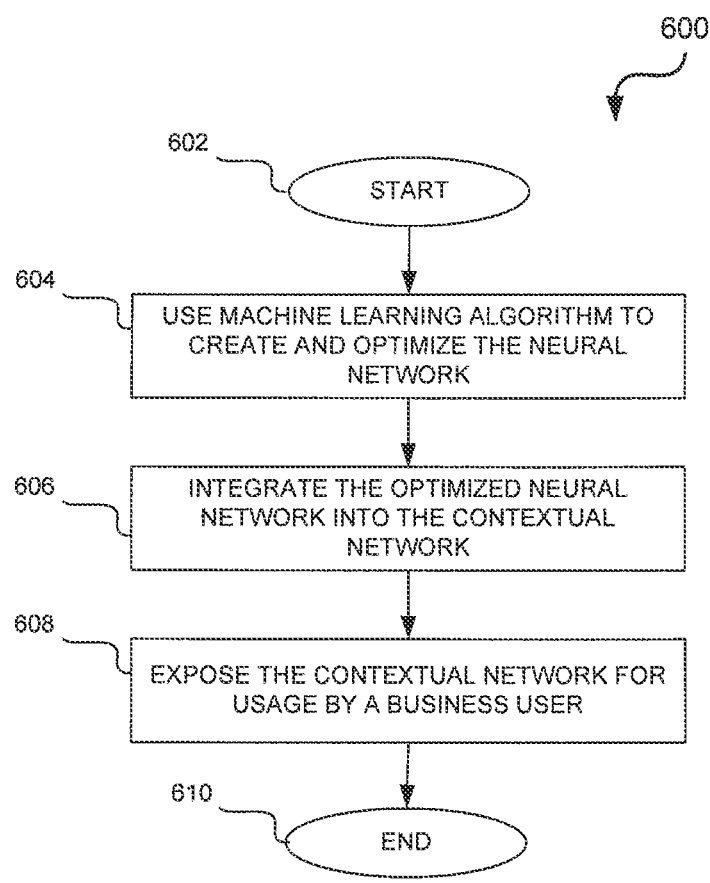
FIG. 6 depicts a flow diagram of a general overview of a method for updating relationships between objects in a meta-model semantic network, in accordance with another example embodiment.

FIG. 6 depicts a flow diagram of a general overview of a method 600 for updating relationships between objects in a meta-model semantic network, in accordance with another embodiment.

In an example embodiment, the method 600 may be implemented by the learning module 104 included in the system 100 of FIG. 1.

Referring to FIG. 6, the method for updating relationships between objects in a meta-model semantic network may begin at operation 602. Then, at operation 604, the learning module 104 uses a machine-learning algorithm to create and optimize the neural network.

At operation 606, the optimized neural network is integrated into the contextual network.

At operation 608, the contextual network is exposed for usage by a business user. The method ends at operation 610.

The present disclosure allows automatic detection of business relations that are most interesting/very often used by the business user. Additionally, because the solution is tightly integrated with the Learning Enterprise in SAP HANA DB solution, it automatically creates the simulation/prediction functionality; this means, the end-user selects which relation in the calculated neural network may be presented. The solution offers code-less building and machine-supported build of business relations (neural-based relations) and its calculation using the learnable technologies (supervised and non-supervised neural networks). This helps business user to automatically detect and present factual business relevant-relations and their usage in business planning (e.g., simulation of potential business scenarios).

The direct connection to the memory-based database allows deep integration of required functionality—storing semantic object and relations in the SAP HANA DB and its very fast statistical analysis and usage of supported by SAP HANA DB direct data controllers (direct memory access to data that speed up the functionality) and creation of rule that are used to prepare data (usage of L-language which is deeply integrated in SAP HANA DB and allows direct-in-memory pre-calculation of business data). This has tremendous benefits—the real knowledge data and business data are used in learning processes and the training of relation algorithms and training/network optimization processes may run frequently, which guarantees the constant adoption of the algorithm to the current relation modifications. In this situation, the changing business knowledge and newest business data may result in detection of changes in customer behavior and so forth, and the machine learning algorithms (e.g., neural networks) may automatically adapt to the business modification (no code modification required as in standard prediction algorithms).

Figure 7:
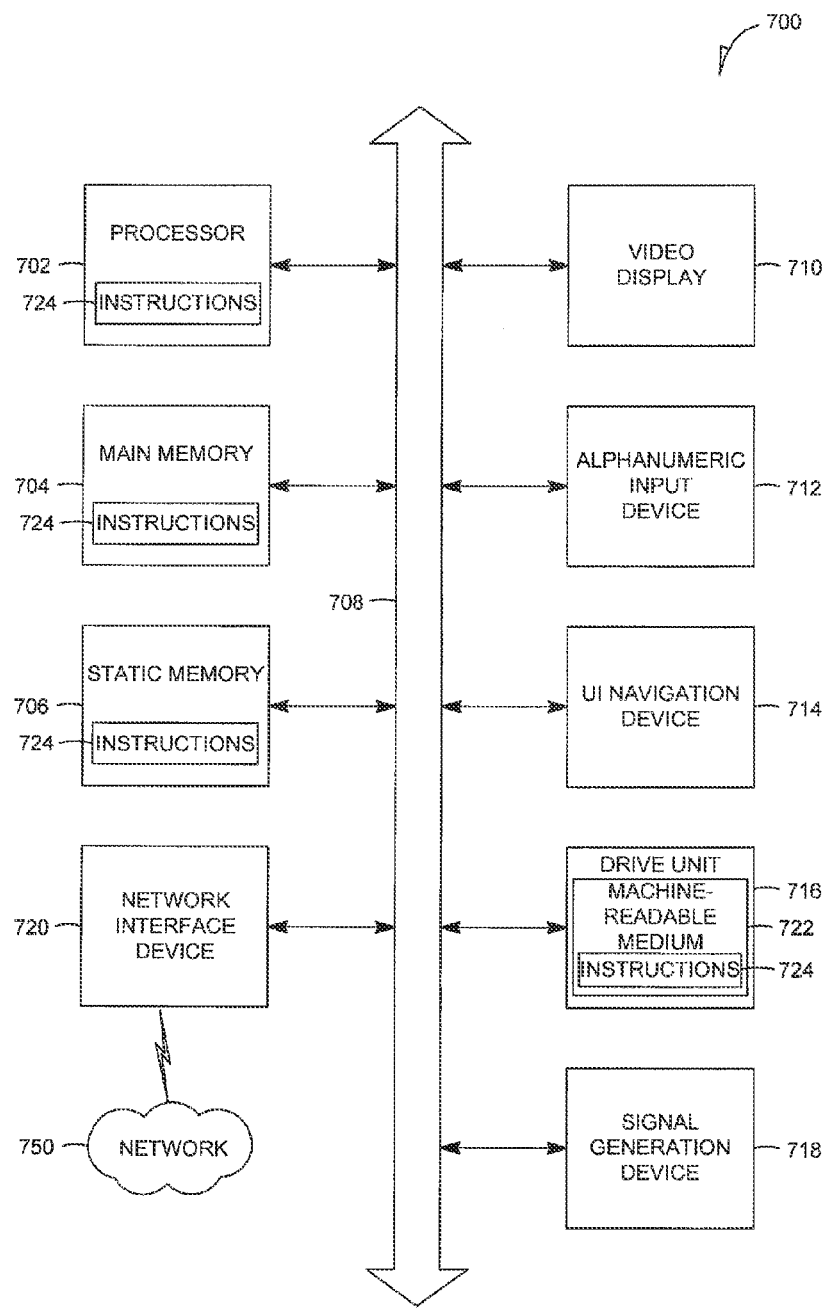
FIG. 7 is a block diagram depicting a machine in the example form of a computing device within which may be executed a set of instructions for causing the machine to perform any one or more of the methodologies discussed herein.

FIG. 7 depicts a block diagram of a machine in the example form of a computing device 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 700 includes a processor 702 (e.g., a central processing unit (CPU), a graphics processing unit (GPU) or both), a main memory 704 (e.g., random-access memory), and static memory 706 (e.g., static random-access memory), which communicate with each other via bus 708. The computing device 700 may father include video display unit 710 (e.g., a plasma display, a liquid crystal display (LCD), or a cathode ray tube (CRT)). The computing device 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by computing device 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an ASIC) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connects the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules.

The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
    generating semantic objects definitions and semantic relations definitions of a meta-model of business objects from a meta-model semantic network, the semantic relations definitions based on connections between semantic objects;
    forming a neural network based on usage of the semantic objects and the semantic relations, neural network configuration data, neural network training data, and calculated prediction data generated during usage of the neural network;
    forming a contextual network based on the neural network, the semantic objects definitions, the semantic relations definitions, the semantic objects definitions and the semantic relations definitions defining nodes that link a term to a knowledge domain and a concept;
    using at least one hardware processor of a machine to perform a statistical analysis of the connections between the semantic objects in the contextual network to identify stronger semantic relations;
    using the identified stronger semantic relations of the semantic objects in the contextual network to update the neural network; and
    updating the contextual network based on the updated neural network.

2. The method of claim 1, wherein the neural network comprises input perceptrons corresponding to input layer elements and output perceptrons corresponding to output layer elements.

3. The method of claim 1, further comprising:
    receiving a request for a semantic object in the contextual network from a business user;
    using the request to update the semantic relation corresponding to the requested semantic object; and
    updating the neural network using the updated semantic relation and requested semantic object.

4. The method of claim 1, further comprising:
    calculating dependencies between business elements of business objects using a learning module.

5. The method of claim 1, further comprising:
    forming semantic relations regarding business functionality defined in existing business applications; and
    detecting the semantic relations in different business related documents.

6. The method of claim 1, further comprising:
    using a machine learning algorithm to create and optimize the neural network;
    integrating the optimized neural network into the contextual network; and
    exposing the contextual network for usage by a business user.

7. The method of claim 1, further comprising:
    storing the meta-model of business objects in a memory-based database, the memory-based database comprising a business application and a semantic database, the business application comprising business objects and business documents, the semantic database comprising a table generator and a table definition.

8. The method of claim 1, wherein the semantic objects comprise business objects, documents, and business terminology.

9. An apparatus comprising:
    a hardware processor,
    a memory-based database comprising semantic objects definitions and semantic relations definitions of a meta-model of business objects from a meta-model semantic network, the semantic relations definitions based on connections between semantic objects;
    a contextual network coupled to the memory-based database, the contextual network comprising a neural network, and semantic objects definitions and relation definitions, the semantic objects definitions and semantic relations definitions defining nodes that link a term to a knowledge domain and a concept, the neural network formed based on usage of the semantic objects and the semantic relations, neural network configuration data, neural network training data, and calculated prediction data generated during usage of the neural network; and
    a learning module coupled to the contextual network comprising a semantic object statistic controller implemented by the hardware processor, the semantic object statistic controller configured to perform a statistical analysis of the connections between the semantic objects in the contextual network to identify stronger semantic relations, to update the neural network with the identified stronger semantic relations of semantic objects in the contextual network, and to update the contextual network based on the updated neural network.

10. The apparatus of claim 9, wherein the neural network comprises input perceptrons corresponding to input layer elements and output perceptrons corresponding to output layer elements.

11. The apparatus of claim 9, wherein the learning module is configured to receive a request for a semantic object in the contextual network from a business user, to use the request to update the semantic relation corresponding to the requested semantic object, and to update the neural network using the updated semantic relation and requested semantic object.

12. The apparatus of claim 9, wherein the learning module is configured to calculate dependencies between business elements of business objects.

13. The apparatus of claim 9, wherein the contextual network is configured to form semantic relations regarding business functionality defined in existing business applications, and to detect the semantic relations in different business related documents.

14. The apparatus of claim 9, wherein the contextual network is configured to use a machine learning algorithm to create and optimize the neural network, to integrate the optimized neural network into the contextual network, and to expose the contextual network for usage by a business user.

15. The apparatus of claim 9, wherein the memory-based database is configured to store the meta-model of business objects, the memory-based database comprises a business application and a semantic database, the business application comprising business objects and business documents, the semantic database comprising a table generator and a table definition, wherein the semantic objects comprise business objects, documents, and business terminology.

16. A non-transitory computer-readable medium that stores instructions, which, when performed by a computer, cause the computer to perform operations comprising:
    generating semantic objects definitions and semantic relations definitions of a meta-model of business objects from a meta-model semantic network, the semantic relations definitions based on connections between the semantic objects;
    forming a neural network based on usage of the semantic objects and the semantic relations, neural network configuration data, neural network training data, and calculated prediction data generated during usage of the neural network;
    forming a contextual network based on the neural network, the semantic objects definitions, the semantic relations definitions, the semantic objects definitions and the semantic relations definitions defining nodes that link a term to a knowledge domain and a concept;
    performing a statistical analysis of the connections between the semantic objects in the contextual network to identify stronger semantic relations;
    using the identified stronger semantic relations of semantic objects in the contextual network to update the neural network; and
    updating the contextual network based on the updated neural network.

17. The non-transitory computer-readable medium of claim 16, wherein the method further comprises:
    receiving a request for a semantic object in the contextual network from a business user;
    using the request to update the semantic relation corresponding to the requested semantic object; and
    updating the neural network using the updated semantic relation and requested semantic object.

18. The non-transitory computer-readable medium of claim 16, wherein the method further comprises:
    calculating dependencies between business elements of business objects;
    forming semantic relations regarding business functionality defined in existing business applications; and
    detecting the semantic relations in different business related documents.

19. The non-transitory computer-readable medium of claim 16, wherein the method further comprises:
    using a machine learning algorithm to create and optimize the neural network;
    integrating the optimized neural network into the contextual network; and
    exposing the contextual network for usage by a business user.

20. The non-transitory computer-readable medium of claim 16, wherein the method further comprises:
    storing the meta-model of business objects in a memory-based database,
    the memory-based database comprising a business application and a semantic database,
    the business application comprising business objects and business documents,
    the semantic database comprising a table generator and a table definition,
    the semantic objects comprising business objects, documents, and business terminology.

* * * * *